(12) United States Patent
Dandy et al.

(10) Patent No.: US 7,308,519 B2
(45) Date of Patent: Dec. 11, 2007

(54) COMMUNICATIONS BUS MANAGEMENT CIRCUIT

(75) Inventors: Jonathan S. Dandy, Beaverton, OR (US); Michael J. Mende, Portland, OR (US); Kevin A. Robertson, Vernonia, OR (US)

(73) Assignee: Tektronix, Inc., Beaverton, OR (US)

( * ) Notice: Subject to any disclaimer, the term of this patent is extended or adjusted under 35 U.S.C. 154(b) by 1109 days.

(21) Appl. No.: 10/355,487

(22) Filed: Jan. 31, 2003

(65) Prior Publication Data
US 2004/0151201 A1 Aug. 5, 2004

(51) Int. Cl.
*G06F 13/00* (2006.01)

(52) U.S. Cl. .................. 710/301; 702/116

(58) Field of Classification Search ............ 702/116, 702/121; 710/104, 301, 302
See application file for complete search history.

(56) References Cited

U.S. PATENT DOCUMENTS

| | | | |
|---|---|---|---|
| 3,525,041 A | 8/1970 | Velsink | |
| 4,672,306 A | 6/1987 | Thong | |
| 4,708,661 A | 11/1987 | Morland | |
| 5,493,211 A | 2/1996 | Baker | |
| 6,145,036 A | 11/2000 | Barnys | |
| 6,232,764 B1 | 5/2001 | Rettig | |
| 6,385,550 B1 | 5/2002 | Jansen | |
| 6,402,565 B1 | 6/2002 | Pooley | |
| 6,725,170 B1 * | 4/2004 | Hickman | 702/106 |

OTHER PUBLICATIONS

Paper: National Institute of Standards and Technology, "A Synopsis of the IEEE P1451—Standards for Smart Transducer Communication", by Kang Lee, unknown date.
Advertising Sheet: "Industry's Most Efficient Solution for Embedding Calibration Data with Analog Sensors", Dallas Semiconductor, MAXIM, unknown date.

* cited by examiner

*Primary Examiner*—Glenn A. Auve
(74) *Attorney, Agent, or Firm*—William K. Bucher

(57) ABSTRACT

A communications bus management circuit for a current probe system detects the connection of the current probe system to an instrument and the connection of a current probe to a current probe amplifier of the system. A controller generates a probe enable signal in the presence of the detected connection to the instrument that is coupled to a switching circuit. Switch elements couple the communications bus of the instrument to the communications bus of the current probe amplifier in the presence of the probe enable signal. The controller further generates a current probe present signal in the presence of the detected current probe that is also coupled to the switching element. A further switch element couples the data line of the instrument to ground via a resistive element in the presence of the current probe present signal and floats the data line when the current probe present signal is absent.

7 Claims, 1 Drawing Sheet

COMMUNICATIONS BUS MANAGEMENT CIRCUIT

BACKGROUND OF THE INVENTION

The present invention relates generally to host/slave communications and more particularly to an independently powered current probe system coupled to a measurement test instrument via a communications bus.

Current probes measure the flux field generated by the movement of electrons through a conductor. The flux field surrounding the conductor is converted to a linear voltage output that can be displayed and analyzed on a measurement test instrument, such as an oscilloscope. One type of current probe is an AC only probe. AC only probes are configured with either a solid core or a split core and are passive devices that do not require external power. AC/DC current probes generally have a split core configuration and include a Hall Effect device for producing a voltage output in response to a DC generated flux field. AC/DC current probes require a voltage source to provide power for biasing the Hall Effect device and for generating a bucking current through the coils of the current probe. An example of an AC/DC current probe system is the A6312 current probe powered by an AM503B Programmable Current Probe Amplifier and TM500 Power Module manufactured and sold by Tektronix Inc., Beaverton Oreg. The TM500 Power Module provides electrical power to the AM503B Programmable Current Probe Amplifier.

The current probe amplifier has two front panel connectors with one connector for coupling the current probe to the amplifier and the other connector for coupling the signal output of the current probe amplifier to the measurement instrument, such as an oscilloscope. The signal output connector is a BNC type connector that accepts a mating BNC type connector affixed to a coaxial cable. The other end of the coaxial cable has a BNC type connector that mates with a BNC type connector mounted on the front panel of the oscilloscope and coupled to an input signal channel of the oscilloscope. The only signal passing between the current probe amplifier and the oscilloscope is the signal output from the amplifier.

Tektronix, Inc. introduced a probe connection system for voltage measurement probes that provides voltage power and communications between the probe and the oscilloscope through a probe/oscilloscope interface connector. The interface connector includes a BNC type connector for coupling a signal under test from the probe tip to the oscilloscope. Surrounding the conventional BNC type connector on the oscilloscope are connector landing pads for coupling voltage power, offset voltage and serial data communications lines to the probe. The preferred communications is via an I²C type communications bus. The connector landing pads are connected to the probe interface by means of spring-loaded pins on the probe connector. The electrical and mechanical characteristics of the above probe connection system is described in U.S. Pat. No. 4,672,306 to Thong and U.S. Pat. No. 4,708,661 to Morland et al. and are said to exhibit Level 2 capability. U.S. Pat. No. 6,232,764 to Rettig et al. and U.S. Pat. No. 6,385,550 to Jansen et al. describe accessories, such as probes, with internal adjustments controlled by a host. These additional capabilities are implemented through the Level 2 interface and are said to exhibit Level 3 capabilities. The voltage measurement probes exhibiting Level 2 and Level 3 capabilities include a Level 2 or Level 3 coding resistor coupled to the communications bus data line and ground. The data and clock lines generally have pull-up resistors in the measurement instrument. Connecting the voltage probe to the measurement instrument produces a voltage divider network that signals the measurement instrument that a Level 2 probe has been connected. The oscilloscopes responds by reading parameter data from an EEPROM in the probe. Disconnecting the probe from the measurement instrument allows the data line to float high signaling the measurement instrument that a probe is not connected to the measurement instrument. In addition, disconnecting the voltage probe from the instrument removes the voltages for the probe.

The P6248 Differential Probe, manufactured and sold by Tektronix, Inc., provides variable attenuation levels of 1× and 10× and has Level 2 capabilities. The attenuation levels are controlled by a mechanical switch mounted on the compensation box of the probe. When the P6248 is connected to a Level 2 compatible oscilloscope, the data line is pulled down by the Level 2 coding resistor indicating to the oscilloscope that a Level 2 probe has been connected and parameter data stored in the EEPROM needs to be read. Switching the attenuator setting from one setting to the next, causes the coding resistor to be momentarily disconnected from the data line which allows the line to float high. At the same time a different EEPROM is connected to the data line matching the new attenuator setting. When the attenuator switch is completely toggled to the new setting, the coding resistor is reconnected to the data line indicating the EEPROM needs to be read. At no time during the switching of the attenuator settings is the probe disconnected from the oscilloscope and at no time is power removed from the probe.

It is desirable to provide Level 2 type probe communications between an oscilloscope and an AC/DC current probe system. However, problems arise when the current probe system is connected to a Level 2 oscilloscope and either the current probe amplifier or the oscilloscope is powered down. The powered down device will essentially ground the I²C clock and data lines, disrupting I²C communications in the other device. If the oscilloscope is powered on and the current probe amplifier is off, the oscilloscopes I²C lines will be pulled down. This is detrimental to other probes or devices attached to the oscilloscope that may share the I²C lines. Since both the clock and data lines typically have pull-up resistors in the oscilloscope, this can also bring down the voltage levels in the oscilloscope coupled to the current probe amplifier. In the other case, when the current probe amplifier is powered on and the oscilloscope is off, the current probe amplifier will be affected. Both the clock and data lines will appear to be pulled to ground by the oscilloscope, falsely indicating I²C communications. This will lock-up control functions on the front panel of the current probe amplifier. Also, any internal communications between the current probe amplifier internal microcontroller and EEPROM devices in the current probe amplifier will be impossible.

What is needed is a communications bus management circuit for a current probe system that controls the communications bus connectivity between the measurement test instrument and current probe amplifier. The communications bus management circuitry needs to detect the presence of a connected and powered measurement test instrument to the current probe amplifier. The communications bus management circuitry further needs to detect the presence and absence of the current probe connected to the current probe amplifier and provide communications to the measurement test instrument when a current probe is connected or changed on the current probe amplifier.

SUMMARY OF THE INVENTION

Accordingly, the present invention is a communications bus management circuit for an independently powered accessory apparatus having a communications bus and an accessory device powered by the accessory apparatus. The independently powered accessory apparatus is preferably a current probe amplifier and the accessory device is a current probe. The communications bus of the accessory apparatus is coupled via a communications bus and voltage cable to a host having a corresponding communications bus. In the preferred embodiment of the invention the host is a measurement test instrument, such as an oscilloscope. The communications bus management circuit has a host detection circuit disposed in the accessory apparatus that receives a voltage input from the host via the communications bus and voltage cable. In the presence of the voltage input, the detection circuit generates a host detect signal output that is coupled to a controller. An accessory device sensing circuit generates an accessory device detect signal having a first signal level when the accessory device is connected to the accessory apparatus and a second state with the accessory device is disconnected from the accessory apparatus. In the preferred embodiment of the invention, the accessory device sensing circuit has a resistive element coupled to ground in the accessory device and a resistive element coupled to a voltage source in the accessory apparatus. Preferably, the resistive element are coding resistors for identifying the accessory device and the accessory apparatus.

The controller receives the host detect signal and the accessory device detect signal and generates an accessory apparatus enable signal output when the host detect signal is present and an accessory device present signal when the accessory device detect signal is at the first signal level. The enable signal and present signal are coupled to a switching circuit. The switching circuit has first and second switch elements coupled on one side to at least a first data line and a clock line of the host communications bus and on the other side to at least a first data line and a clock line of the accessory apparatus communications bus. A third switch element is coupled on one side to the data line of the host communications bus via a resistive element and on the other side to ground. The switch elements having a high impedance in the open state. The accessory apparatus enable signal closes the first and second switch elements for coupling the host communications bus to the accessory apparatus communications bus when the accessory apparatus enable signal is present and closes the third switch element for coupling the resistive element to the data line when the accessory device present signal is present. In the preferred embodiment, the switching element is a bus switch.

The objects, advantages and novel features of the present invention are apparent from the following detailed description when read in conjunction with appended claims and attached drawings.

DETAILED DESCRIPTION OF THE PREFERRED EMBODIMENT

Figure 1:
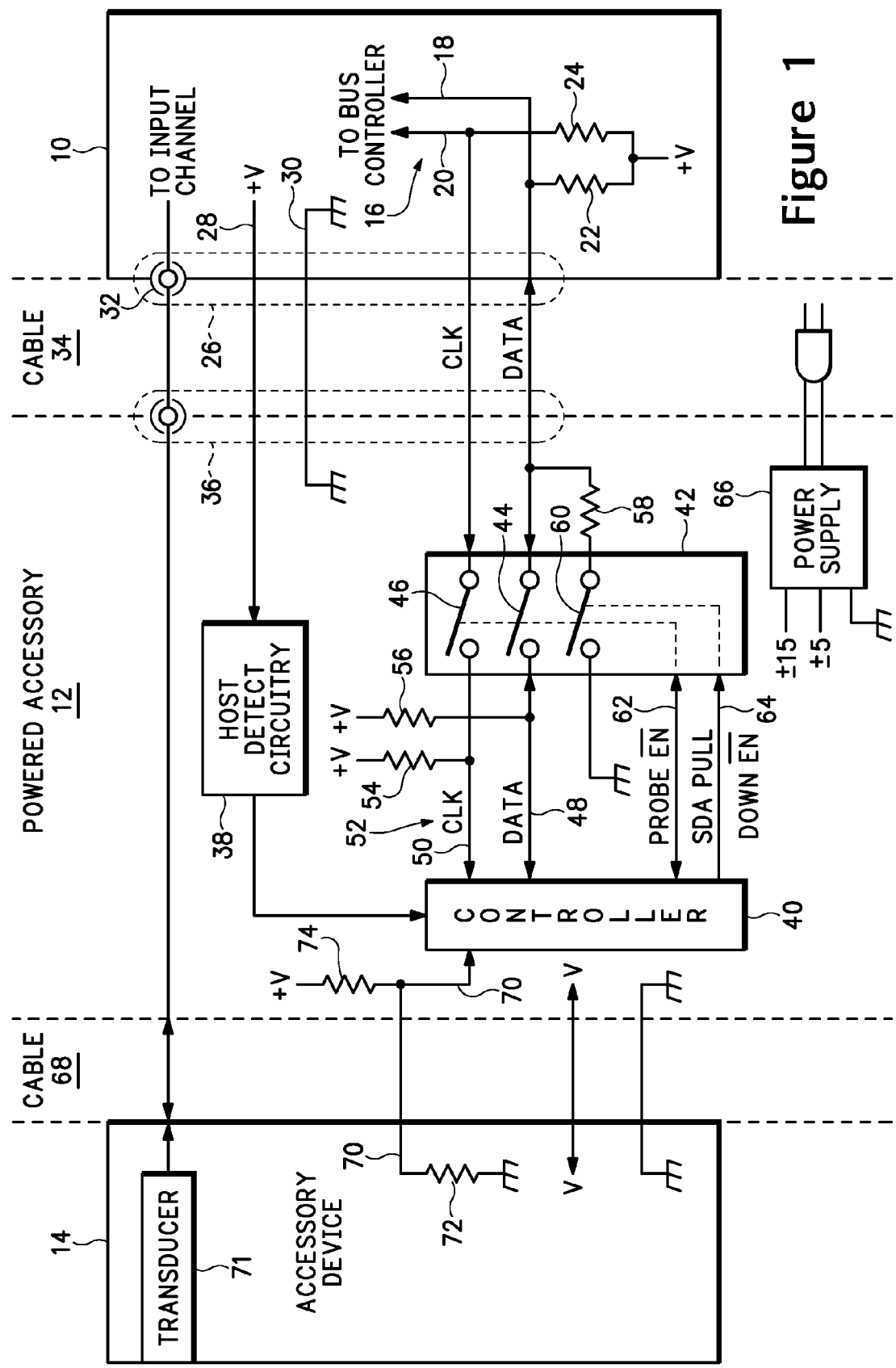
FIG. 1 is a representative block diagram of a host and independently powered accessory apparatus with an attached accessory device incorporating the communications bus management circuitry according to the present invention.

The communications bus management circuit of the present invention is shown in the representative block diagram of a host device 10 and an independently powered accessory apparatus 12 having an attachable accessory device 14. The host device 10 is preferably a measurement test instrument, such as an oscilloscope or the like. The host includes a communications bus 16, which is preferably a serial communications bus, such as an I$^2$C bus or the like. The serial communications bus 16 has at least a first data line 18 and a clock line 20 that is coupled to a bus controller (not shown) in the host 10. The data and clock lines 18 and 20 are preferable coupled to a positive voltage supply through pull-up resistors 22 and 24. The data and clock lines 18 and 20 are coupled to a front panel interface 26. Preferably the front panel interface 26 has Level 2 capabilities as previously described. A voltage signal line 28 and host ground line 30 provide a voltage signal and host ground to the front panel interface 26. The front panel interface 26 further includes a signal connector 32 for receiving an electrical signal from the accessory device 14 through accessory apparatus 12. The front panel interface 26 is not limited to a Level 2 mechanical implementation and other interface designs, such as the TEKCONNECT™ signal interconnect described in U.S. Pat. No. 6,402,565 to Pooley et al. or other similar types of interconnect schemes may be used with the communications bus management circuit of the present invention.

A Level 2 type cable 34 couples the host 10 to the accessory apparatus 12. The accessory apparatus 12 has a corresponding Level 2 interface 36 for connecting the communications bus lines 18 and 20, the voltage signal line 28 and the host ground 30 from the host 10 and the measurement signal to the host 10. Host detect circuitry 38 receives the voltage signal from the interface 36 and generates a host detect signal that is coupled to a controller 40. The data and clock lines 18 and 20 are coupled to one side of a switching circuit 42. The data and clock lines 18 and 20 are connected to switch elements 44 and 46 in the switching circuit 42. The other side of the switch elements 44 and 46 are coupled to respective data and clock lines 48 and 50 of an accessory apparatus communications bus 52. The accessory apparatus communications bus 52 is coupled the controller 40. The accessory apparatus data and clock lines 48 and 50 are preferably coupled to a positive supply voltage via pull-up resistors 54 and 56. The data line 18 is also coupled to ground through a resistive element 58 selectively coupled to the data line 18 via a switch element 60 in the switching circuit 42. Control signals are coupled from the controller 40 to the switching circuit 42 via control lines 62 and 64. Power supply circuitry 66 receives AC power from an external source and generates voltage supplies for the powered accessory apparatus 12.

The accessory device 14 is preferably provided with a cable 68 that couples the accessory device 14 to the accessory apparatus 12. The cable 68 preferably has multiple conductive lines for providing voltage power and electrical ground to the accessory device 14, a signal output from the accessory device 14 and control signals to the accessory apparatus 12. The cable 68 may be affixed to the accessory device 14 or may be an attachable cable that plugs into an connector on the accessory device 14. The other end of the cable 68 has a connector that mates with a corresponding connector on the front panel of the accessory apparatus 12. The accessory device 14 has a control line 70 coupled to electrical ground through resistive element 72. The control line 70 is coupled via the cable 68 to the accessory apparatus 12. The control line 70 is also coupled to a positive voltage supply via a pull-up resistor 74 in the accessory apparatus 12 creating a voltage divider network on the control line. The junction of the voltage divider network on the control line 70 is coupled to the controller 70. The accessory device includes a transducer element 76 that generates a signal output from the accessory device 14 that is coupled throuqh the accessory apparatus 14 to the host 10.

The operation of the communications bus management circuit will be described in relation to an independently powered current probe amplifier representing the accessory apparatus 12, a current probe representing the accessory device 14, and a measurement test instrument, such as an oscilloscope representing the host 10. The current probe 14 is preferably an AC/DC current probe having a transformer core with a Hall Effect device disposed in core and secondary winding acting a transducer. The current probe amplifier 12 provides bias voltages to the Hall Effect device as well as a bucking current to coils in the current probe 14. The voltage output of the Hall Effect device as well as the output signal representative of the current flow through a device under test is coupled back to the current probe amplifier. AC or DC coupling circuitry and amplification circuitry may be provided in the current probe amplifier 12 for the output signal from the current probe 14. Operation of the above described current probe system is described in U.S. Pat. No. 3,525,041 to Velsink and U.S. Pat. No. 5,493,211 to Baker.

Oscilloscopes are generally multi-channel measurement instruments that are capable of accepting multiple measurement probes coupled to separate input channels of the oscilloscope. Each input channel may be provided with Level 2 or Level 3 capabilities and share common voltage supply sources and a common communications bus. The operation of the communications bus management circuit will be described in relation on one channel of the oscilloscope but it is understood that multiple current probe systems may be connected to the oscilloscope inputs at one time.

With the oscilloscope 10 powered on and no device coupled to the input of the oscilloscope, the data and clock lines 18 and 20 are pulled-up by the pull-up resistors 22 and 24. When the current probe amplifier 12 is coupled to the input channel of the oscilloscope 10 via the cable 34, the data and clock lines 18 and 20 are coupled to the switching circuit 42 and the voltage signal is coupled to the host detect circuitry 38. The switching circuit 42 is preferably a bus switch, such as manufactured and sold by IDT Corp., Santa Clara, Calif. under part number 74QST3384. The switch elements 44, 46 and 60 of the bus switch 42 have a high input impedance when the switch elements are open such as when power is off to the current probe amplifier 12. This prevents the current probe amplifier 12 from pulling down the data and clock lines 18 and 20 when amplifier 12 is connected to the oscilloscope 10 and the amplifier 12 is powered down. Such a condition would disrupt bus communications for other devices connected to the common communications bus. The voltage signal to the host detect circuitry 38 is coupled to the base of a PNP transistor. The collector output of the PNP transistor is coupled to an inverting input of a comparator whose inventing input is coupled to a reference voltage. The output of the comparator is coupled to the controller 40. Coupling the voltage signal from the oscilloscope to the base of the PNP transistor prevents loading of the voltage supply in the oscilloscope when the current probe amplifier 12 is powered off.

With the oscilloscope 10 and the current probe amplifier 12 powered on and connected by cable 34, the voltage signal coupled to the host detect circuitry generates a host detect signal that is coupled to the controller 40. In the preferred embodiment of the invention the controller 40 is a microcontroller, such as manufactured and sold by Motorola, Inc. Schaumburg, Ill. under part number MC68HC908AB32CFU. The microcontroller 40 includes a microprocessor, flash, RAM and EEPROM memory for storing commands executable by the microprocessor and parameter values associated with the current probe amplifier 12 and the attached current probe 14. Alternatively, separate EEPROMs may be included in the current probe amplifier 12 that are accessed in response to voltage divider value on the control line 70. The host detect signal is interpreted by the controller 40 which generated an accessory apparatus enable or probe enable signal that is coupled to the switching circuit 42. The switching circuit, in response to the enable signal, closes the contact of switch elements 44 and 46 coupling the data and clock lines 18 and 20 of the host communications bus 16 to the data and clock lines 48 and 50 of the current probe amplifier communications bus 52. The data and clock signals passing through the switching circuit 42 are attenuated necessitating the addition of the pull-up resistors 54 and 56 on the data and clock lines 48 and 50 of the current probe amplifier communications bus 52. If the cable 34 connecting the oscilloscope 10 to the current probe amplifier 12 is removed, the voltage signal is removed from the host detect circuit 38 whereupon the host detect circuit 38 stops outputting the host detect signal to the controller 40. The controller 40 interprets the absence of the host detect signal as the oscilloscope 10 being disconnected from the current probe amplifier 12 and removes the enable signal to the switching circuit 42 which causes the switching elements 44 and 46 to open.

Level 2 capability oscilloscopes are designed to monitor the data line for a change of the voltage level on the line. When a change is detected, the oscilloscope knows a probe or other accessory device has been connected to the input channel. Because the current probe 14 is connected to the current probe amplifier 12 and not directly to the input channel of the oscilloscope 10, the communications bus management circuit needs to inform the oscilloscope 10 when a current probe 14 has been connected or disconnected from the current probe amplifier 12. With no current probe 14 connected to the current probe amplifier 12, the data lines 18 and 48 are allowed to float high through the pull-up resistors 22 and 54. The control line 70 floats high through the resistive element 74. Connecting the current probe to the current probe amplifier creates the voltage divider network on the control line 70 with resistive elements 72 in the current probe and resistive element 74 in the current probe amplifier. The resistive elements 72 and 74 are preferably coding resistors that generated specific voltage levels depending on the values of the coding resistors 72 and 74. The voltage divider network generates an accessory device detect signal or probe detect signal that is coupled on control line 70 to the controller 40. The controller 40 interprets the change in the voltage level on the control line 70 as a connected current probe 14. The value of the voltage on the control 70 also provides information to the controller as to the specific type of current probe connected to the current probe amplifier 12. In the preferred embodiment, the controller 40 connects one of the series of the EEPROMs containing parameter information on the identified current probe to the communications bus data line 18. Alternately, the controller 40 may load the on-board EEPROM with the appropriate parameters for the identified current probe. The controller 40 generates an accessory device present signal or probe connected signal in response to the probe detect signal. The probe connected signal is coupled to the switching circuit via control line 64. The probe detect signal causes the switch element 60 to close coupling the data line 18 to ground through resistive element 58. The pulling down of the data line 18 signals the oscilloscope 10 that a probe 14 has been connected to the input channel and probe related data is available for reading by the oscilloscope 10.

It is important to note that pulling down on the data line 18 indicates to the oscilloscope 10 that a device has been connected to the input channel of the scope. In actuality the current probe amplifier 12 has been connected to the input channel of the oscilloscope 10 even before a current probe 14 has been connected to the current probe amplifier 12. If the pull down resistor 58 was hard wired to the data line 18 in the current probe amplifier 12 to indicate that the current probe amplifier 12 was connected to the oscilloscope input channel, the only way to inform the oscilloscope 10 that a current probe 14 has been connected to the current probe amplifier 12 or that a connected current probe 14 has been replaced with a new current probe is to disconnect the cable 34 from the oscilloscope 10 or from the current probe amplifier 12. The use of the controller 40 and the switching circuit 42 to complete the circuit for the data line pull-down resistive element 58 allows current probe replacement without disconnecting the current probe system from the oscilloscope.

A communications bus management circuit has been described having a switching circuit operating under control of a microcontroller for connecting the host communications bus to an accessory apparatus bus in response to a host detect signal from a host detect circuit. The switching circuit is further responsive to a command from the microcontroller for connecting a pull down resistor to the data line of the host communications bus when a accessory device is coupled to the accessory apparatus.

It will be obvious to those having skill in the art that many changes may be made to the details of the above-described embodiments of this invention without departing from the underlying principles thereof. The scope of the present invention should, therefore, be determined only by the following claims.

What is claimed is:

1. A communications bus management circuit disposed in an independently powered accessory apparatus for coupling to a host via a communications bus and voltage cable and to an accessory device via an accessory device cable comprising:

a communications bus having a data line and a clock line disposed in the independently powered accessory apparatus;

a host detection circuit receiving a voltage input from the host when the communications bus and voltage cable is coupled between the host and the independently powered accessory apparatus and generating a host detect signal output;

a controller receiving the host detect signal and generating an accessory apparatus enable signal output when the host detect signal is present;

a switching circuit disposed between first and second segments of the communications bus with the first segment coupled between the switching circuit and the controller and the second segment coupled between the switching circuit and the communications bus and voltage cable and having first and second switch elements coupled to the data and clock lines of the communications bus with the switching circuit receiving the accessory apparatus enable signal for coupling a host communications bus to the controller via the communications bus when the accessory apparatus enable signal is present;

an accessory device sensing circuit generating an accessory device detect signal having a first signal level when the accessory device is connected to the accessory apparatus and a second signal level when the accessory device is disconnected from the accessory apparatus with the controller coupled to the accessory device sensing circuit for receiving the accessory device detect signal and generating an accessory device present signal when the accessory device detect signal is at the first signal level representing the accessory device being coupled to the accessory apparatus; and the switching circuit having a third switch element disposed between a ground connection and a resistive element coupled to the data line of the second segment of the accessory apparatus communications bus with the switching circuit receiving the accessory device present signal for coupling the resistive element to the data line when the accessory device present signal is present.

2. The communications bus management circuit as recited in claim 1 wherein the independently powered accessory apparatus comprises a current probe amplifier and the accessory device comprises a current probe.

3. The communications bus management circuit as recited in claim 1 wherein the host comprises a measurement test instrument.

4. The communications bus management circuit as recited in claim 3 wherein said measurement test instrument further comprises an oscilloscope.

5. The communications bus management circuit as recited in claim 1 wherein the accessory device sensing circuit further comprises a resistive element coupled to ground in the accessory device and a resistive element coupled to a voltage source in the accessory apparatus.

6. The communications bus management circuit as recited in claim 5 wherein the respective resistive elements in the accessory device and the accessory apparatus are coding resistors for identifying the accessory device and the accessory apparatus.

7. The communications bus management circuit as recited in claim 1 wherein the switching circuit comprises a bus switch.

* * * * *